United States Patent
Ryegård et al.

(10) Patent No.: US 7,630,775 B2
(45) Date of Patent: Dec. 8, 2009

(54) CONTROL SYSTEM AND METHOD FOR CONTROLLING ONE OR SEVERAL MANIPULATORS

(75) Inventors: Henrik Ryegård, Västerås (SE); Fredrik Pahlm, Västerås (SE); Jesper Bergsjö, Västerås (SE); Peter Eriksson, Västerås (SE); Ian Bird-Radolovic, Västerås (SE)

(73) Assignee: ABB AB, Västerås (SE)

( * ) Notice: Subject to any disclaimer, the term of this patent is extended or adjusted under 35 U.S.C. 154(b) by 466 days.

(21) Appl. No.: 10/517,145

(22) PCT Filed: Jun. 5, 2003

(86) PCT No.: PCT/SE03/00933

§ 371 (c)(1), (2), (4) Date: Dec. 7, 2004

(87) PCT Pub. No.: WO03/103903

PCT Pub. Date: Dec. 18, 2003

(65) Prior Publication Data

US 2005/0209711 A1    Sep. 22, 2005

(30) Foreign Application Priority Data

Jun. 7, 2002    (SE) ................... 0201761

(51) Int. Cl.
*G05B 11/01* (2006.01)
*G05B 19/18* (2006.01)

(52) U.S. Cl. ............... 700/19; 700/56; 700/2; 700/17; 700/84; 700/245; 345/156; 345/174

(58) Field of Classification Search ........ None
See application file for complete search history.

(56) References Cited

U.S. PATENT DOCUMENTS

| 4,578,764 A | 3/1986 | Hutchins et al. |
| 4,611,296 A * | 9/1986 | Niedermayr ............. 700/260 |
| 4,888,708 A * | 12/1989 | Brantmark et al. ........ 700/264 |
| 5,241,250 A | 8/1993 | Nagasawa et al. |
| 5,274,781 A | 12/1993 | Gibart |

(Continued)

FOREIGN PATENT DOCUMENTS

EP    0338117 A2    10/1986

(Continued)

*Primary Examiner*—Dalena Tran
*Assistant Examiner*—Ian Jen
(74) *Attorney, Agent, or Firm*—Venable LLP; Eric J. Franklin

(57) ABSTRACT

A control system for controlling one or more manipulators. One or more drives control motors driving the movements of the manipulator. An axis computer provides control signals to the drives. A main computer is adapted to execute a program with instructions for the movements and supplies the axis computer with control instructions. Physically separated modules are adapted to be placed at separated locations and to handle different functions. Each module may be surrounded by a casing of its own, may have its own power supply and has a well-defined interface in relation to the other modules. The computers and drives are arranged in the modules. One of the modules is a main computer module, which comprises the main computer. Another of the modules is a drive module, which comprises the axis computer.

7 Claims, 2 Drawing Sheets

U.S. PATENT DOCUMENTS

| | | | |
|---|---|---|---|
| 5,404,290 A * | 4/1995 | Tsuchihashi et al. | 700/61 |
| 6,218,802 B1 * | 4/2001 | Onoue et al. | 318/568.13 |
| 6,374,156 B1 * | 4/2002 | Shimogama et al. | 700/245 |
| 6,522,949 B1 * | 2/2003 | Ikeda et al. | 700/245 |
| 6,587,749 B2 * | 7/2003 | Matsumoto | 700/245 |
| 6,697,681 B1 * | 2/2004 | Stoddard et al. | 700/17 |

FOREIGN PATENT DOCUMENTS

| | | |
|---|---|---|
| EP | 0728559 A2 | 8/1996 |

* cited by examiner

CONTROL SYSTEM AND METHOD FOR CONTROLLING ONE OR SEVERAL MANIPULATORS

TECHNICAL FIELD

The present invention relates to a control system for control of one or more manipulators, wherein the control system comprises one or more computers and drive units for controlling the manipulators. A manipulator is a movable mechanical unit, the movements of which are driven by one or more motors. The invention is applicable to all types of mechanical units, whose movements are controlled by a computer program. Examples of manipulators are industrial robots and means of transport such as roller conveyors. The invention is especially useful in connection with the control of industrial robots.

The present invention also relates to use of the control system according to the invention for control of an industrial robot.

The present invention also relates to a method for control of one or more manipulators.

BACKGROUND ART

An industrial robot comprises a plurality of arms that are rotatable relative to each other about a plurality of axes. The movements of the axes are driven by motors mounted on each axis. The speeds and accelerations of the axes are controlled by the control system of the robot that generates control signals to the motors. The control system comprises drives that control the motors by converting direct current to a variable alternating current in dependence on control signals from an axis computer. Each motor has a drive of its own. The control system may have one or more axis computers. Further, the control system comprises a main computer that is adapted to execute a program with instructions for the movements and that supplies the axis computer with control instructions. These control instructions are then transformed by the axis computer into control signals for the drives. The function of the axis computer is thus to ensure that orders from the main computer are carried out. The task of the main computer is to plan the movement path of the robot, so-called path planning, and the task of the axis computer is to ensure that the robot completes the planned path. The control signals to the drives determine motor torque, motor speeds and drive currents for each axis. The main computer also has many other tasks, such as handling I/O systems, application programs, interpolation, and communication with external systems.

A conventional control system for an industrial robot comprises a coherent unit, where the different parts in the control system, such as main computer, axis computer and drives, are mounted in one and the same cabinet with a common power supply, a common interface externally, and a common casing. The control system is provided with an internal bus for communication between the different parts.

From European patent No. 728 559 B1, it is known, instead, to arrange the drives directly on the robot. Each one of the drives is mounted adjacent to the motor that it is to control. This is advantageous since the cables between the drives and the motor will be shorter, which reduces the radiation of high-frequency electromagnetic waves, which in turn may cause disturbance. Another advantage of shorter cables is that the risk of incoming EMC disturbances on the control signals is reduced.

It is common practice to have several robots arranged together in manufacturing cells or along a production line. In such applications, the robots are either provided with individual control systems or with a common control system. Such a common control system comprises a main computer or one or more axis computers as well as one drive unit per robot. A drive unit comprises a plurality of drives, usually between six and nine drives depending on how many motors are to be controlled. The axis computers and the main computer communicate via an internal bus.

One disadvantage of these control systems is that they are inflexible. If it is desired, for example, to add a new function or replace some part of the control system, it is necessary today to intervene and make changes in the existing control system. To be able to add more robots, the existing control system must either be oversized even from the start regarding computer utility and power supply, or the whole of or parts of the control system must be replaced or be rebuilt to obtain the necessary computer utility and power supply.

SUMMARY OF THE INVENTION

The object of the present invention is to provide a flexible control system for control of one or more manipulators. The fact that the control system is flexible means that it is easy to connect a new manipulator to the control system, to add a new function to the control system, and to replace some part of the control system.

This object is achieved according to the invention with the control system described in the introductory part of the description, which is characterized in that the control system comprises a plurality of separate modules, adapted to handle various functions, whereby each one of the modules has its own power supply and is adapted to communicate with at least one of the other modules, the computers and the drive units being arranged in the modules. Each module is autonomous and has its own well-defined interface with respect to the other modules. The separate modules may either be placed together or be geographically separated at suitable locations.

Because the functions of the control system have been divided into a plurality of separate modules with their own power supply, it is easy to add a new function or to extend the capacity of the control system by connecting a new module. When something breaks down in the control system, the faulty module can simply be replaced. For each module that is added, the total power supply of the control system increases. If a new manipulator is to be connected to the control system, it is sufficient to connect another module to upgrade the control system. Thus, the control system need not be oversized from the start.

According to the invention, independent functional units are identified and separate modules with these functions are created. In this way, the need of information exchange between the modules is reduced, which implies that no high bandwidth is needed for the communication channels between the modules. This means that it is sufficient to use common simple standard protocols for the communication between the modules and thus inexpensive standard components may be used.

According to a preferred embodiment of the invention, the control system comprises a separate main computer module and at least one separate drive module, the main computer being arranged in the main computer module and the axis computer being arranged in the drive module. This is advantageous when it is desired to connect a new manipulator to the control system, since it is sufficient to connect a new drive module for upgrading the control system both with regard to power supply and computer utility.

According to another preferred embodiment of the invention, the control system comprises at least two separate drive modules. Advantageously, each drive module is adapted to control one manipulator. By arranging each drive module to control one manipulator, a new drive module is readily connected each time a new unit is added.

According to a further preferred embodiment of the invention, said drive module comprises a drive unit comprising a plurality of drives. One advantage of mounting the drives together with the axis computer is that it will be easy to connect a new manipulator. The power supply to the drive module is adapted to the number of drives. When the control system is extended by another drive module, the power supply is automatically adapted to the number of drives and hence to the number of connected manipulators. One advantage of mounting all the drives together in the same module is that this makes it possible to provide the drives with a common cooling system.

According to still another embodiment of the invention, the control system comprises a separate transformer module, which has a transformer and is adapted to transform the incoming ac voltage to the correct voltage level for the modules. Different countries deliver alternating current with different voltage levels. Whether a transformer is needed, and in that case which one, depends on the country in which the system is to operate. Because the transformer is arranged as a separate module, the module is easily replaced if another transformer is needed.

According to yet another embodiment of the invention, the control system comprises a separate control-panel module with the control panel of the control system. By arranging the control panel in a separate module, it is possible to integrate the control panel into some other piece of equipment so as to make it easily accessible to the operator.

According to a further embodiment of the invention, each one of the modules is enclosed in its own casing. The casing protects the modules against the environment and makes it possible to place the modules separately. The modules are advantageously arranged physically separated. In this way, the modules may be easily spread out and placed in different places. In many cases, it is advantageous to be able to spread out the modules in different places. The drive modules are preferably located as close to the motors as possible to obtain short cables which are less sensitive to EMC disturbances. In many branches of industry, there is a shortage of floor space due to compressed manufacturing cells and lines. With a drive system according to the invention, it is possible to place the various modules where there is free floor space.

According to another embodiment of the invention, at least some of the modules are arranged to communicate via the Ethernet. Ethernet is a simple standard protocol. By arranging the modules so that they can use the Ethernet, inexpensive standard components may be used.

According to still another embodiment of the invention, the control system comprises at least three such modules. A control system may comprise many modules, of which some modules handle different functions and others handle the same function. It is thus possible that the control system may comprise several modules with the same function. By the characteristic feature that the control system comprises at least three modules is meant that the control system comprises three modules irrespective of whether these handle different functions or the same function.

An additional object of the invention is to suggest a method for controlling one or more manipulators. This object is achieved with a method that is characterized in that said one or more computers and drive units are arranged in modules, that the modules are arranged with their own power supply, and that the modules are brought to communicate with at least one of the other modules. The control system is divided into a plurality of separate modules adapted to handle different functions, whereby the modules are provided with their own power supply and are brought to communicate with at least one of the other modules.

Although not explicitly described in the claims, the invention also covers the method in combination with the characteristic features of the control system according to any of the appended claims.

BRIEF DESCRIPTION OF THE DRAWINGS

The invention will now be explained in greater detail by means of various exemplary embodiments with reference to the accompanying drawing.

DESCRIPTION OF THE PREFERRED EMBODIMENTS

Figure 1:
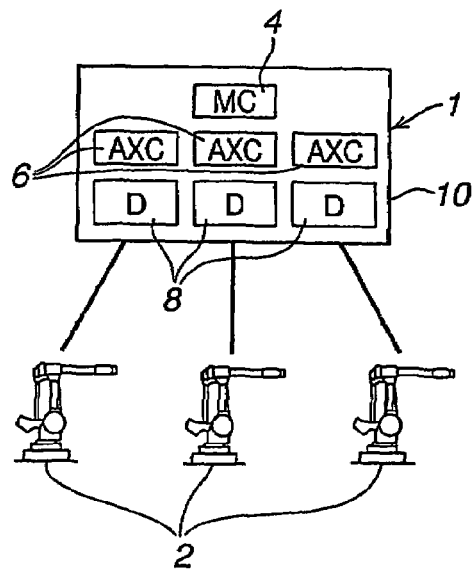
FIG. 1 shows a control system according to the prior art.

FIG. 1 shows a control system 1 according to the prior art, controlling three industrial robots 2. The control system 1 comprises a main computer 4, three axis computers 6 and three drive units 8, each of which including a number of drives. Each drive unit 8 is connected to a robot 2 and supplies the robot with control signals and electric power. The main computer, the axis computers and the drive units are arranged together and constitute one unit that is enclosed by a common casing 10. The control system has a common power-supply unit that produces voltages with the correct quality and with the correct level for all parts included in the control system. The main computer and the axis computers communicate with each other and with the drive units via an internal bus (not shown in the figure). A control system according to the invention comprises at least three separate modules, which are arranged to handle different functions. A plurality of different types of modules are available and each type of module has its own function. Each module has its own well-defined interface with respect to the other modules. When the modules are interconnected, they form a control system with all the functions of a conventional control system. The control system composed of the separate modules need not include all types of modules and may include several modules of the same type. The modules have their own power supply and are arranged so as to be able to communicate with at least one of the other modules. A plurality of the different types of modules are also provided with their own computer utility.

Figure 2:
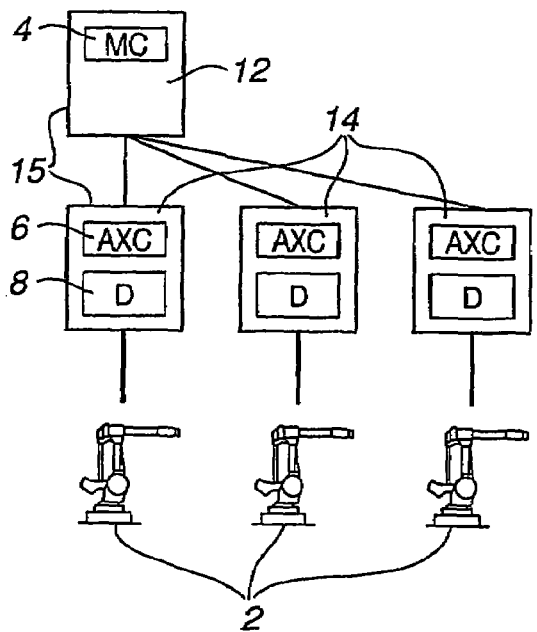
FIG. 2 shows a control system according to a first embodiment of the invention.

FIG. 2 shows a control system according to one embodiment of the invention, controlling three robots 2. The figure shows four modules, one main-computer module 12 and three drive modules 14. The control system also comprises other modules that are not shown in the figure. The main-computer module 12 comprises the main computer 4 of the control system and handles the functions of the main computer, such as executing robot programs and giving orders to the drive module regarding the movement of the robot, such as the desired position and speed. Each one of the drive modules 14 comprises an axis computer 6 and a drive unit 8. The function of the drive module is to carry out the orders of the main computer so that the robot carries out the movement ordered. Each module 12, 14 is enclosed in its own casing 15 and constitutes a separate physical unit. Each one of the drive modules 14 is directly connected to the main-computer module and communicates therewith via an Ethernet link.

Figure 3:
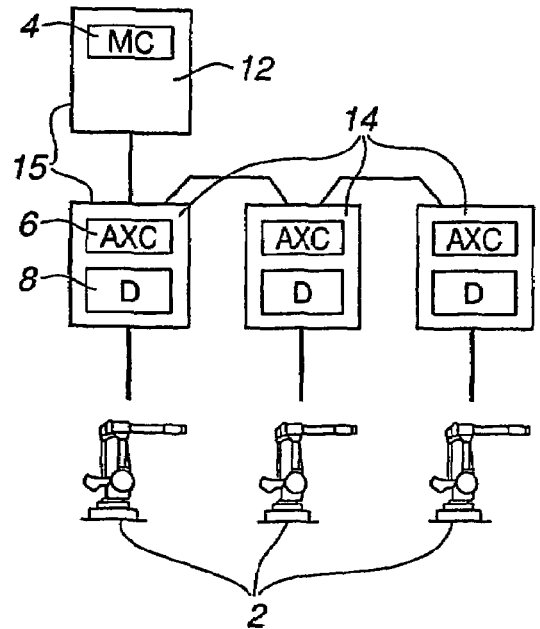
FIG. 3 shows a control system according to a second embodiment of the invention.

FIG. 3 shows another embodiment of a control system according to the invention, wherein the drive modules 14 instead are arranged in series. The first drive module is connected to the main-computer module 12 and to the second drive module, which in turn is connected to the third drive module. These connections comprise communication via the Ethernet. Electric power is transmitted separately to each module.

Figure 4:
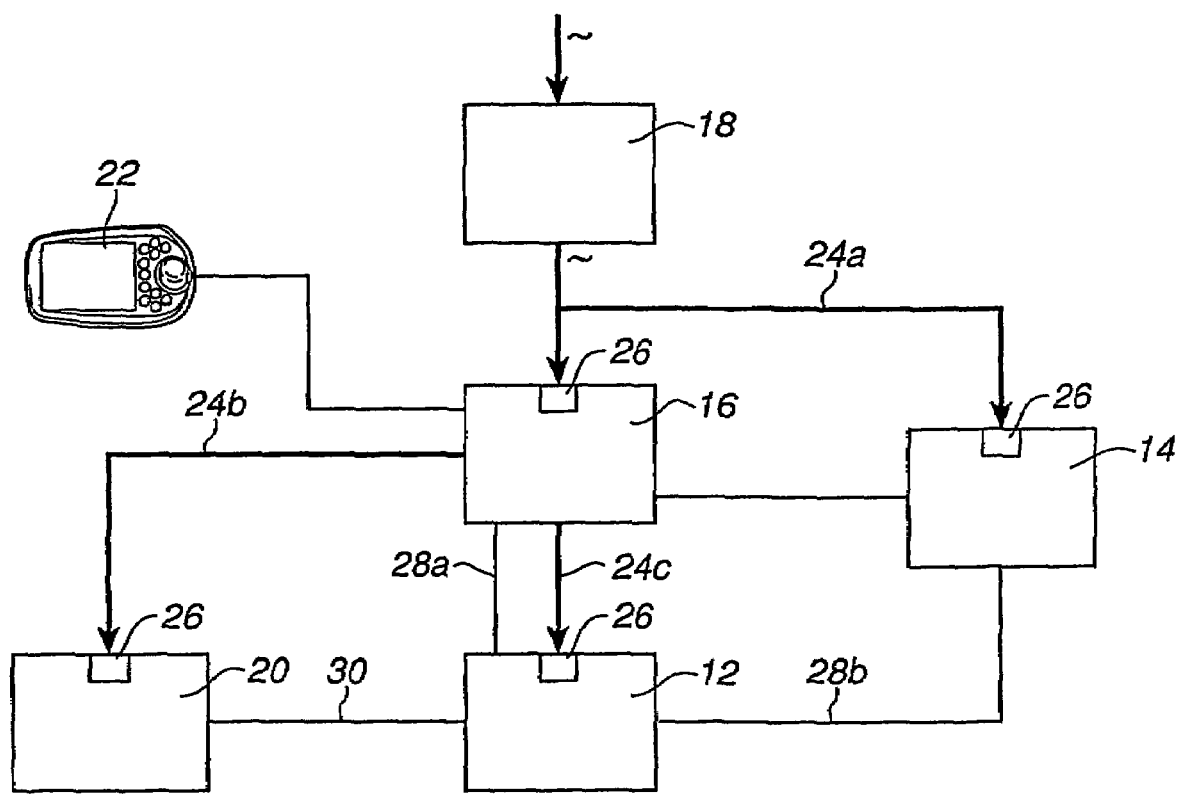
FIG. 4 shows the control system in greater detail.

FIG. 4 shows in more detail an embodiment of a control system according to the invention. The control system comprises five different types of modules: one main-computer module 12, one drive module 14, one control module 16, one transformer module 18, and one client I/O module 20. The main-computer module 12 includes the main computer, the communication card (RCC) of the robot, and one or more field bus cards. The main computer constitutes the centre of the system and it controls and reacts to communication from other parts of the system. The main computer executes robot programs and gives orders to the drive module regarding the position and speed of the robot. The drive module 14 comprises a drive unit with up to nine drives, an axis computer and a contactor card. A drive module may thus drive a six-axis robot with three external axes.

The control module 16 comprises an operating panel with built-in power supply and the control panel of the control system with an emergency-stop button and buttons for selecting various settings as well as a main switch. The control module 16 constitutes the centre of the safety functions of the robot and it supervises the whole safety chain. Most of the external safety signals for the robot are connected to the operating panel. The control module preferably includes a computer. A portable programming unit (TPU) 22 is also connected to the control module 16. The programming unit 22 is used by an operator for programming the robot. The client I/O module comprises I/O panels and is adapted to receive electric equipment or other electronics. What type of electronics or equipment to install into the module is determined by the robot user. The equipment installed may, for example, be a welding machine or a painting machine. It is possible for the user to make external changes in this module so as to suit the requirements of the user.

The transformer module 18 comprises a transformer and a switch. The transformer module is supplied with ac voltage from the electricity network and transforms the ac voltage into the desired voltage level. The transformer module in turn supplies the other modules with ac voltage. All the modules have their own power supply, which means that they are provided with a power-supply unit 26 that converts incoming alternating current into direct current and produces the voltages that are needed in the module. The power-supply units 26 produce voltages of the correct quality and of the correct level for its module.

Each one of the modules 12-20 is enclosed in a casing for protection against pollutants in the surroundings. The modules that are in need thereof are provided with their own cooling system. A voltage arriving at the transformer module 18 is transformed by the transformer into a suitable voltage level and is then supplied to the modules via the cables 24*a-c* connected to the power-supply unit 26 in the modules. In this embodiment, the main-computer module 12 communicates with the control module 16 via an Ethernet cable 28*a*. The main-computer module 12 also communicates with the drive module 14 via an Ethernet cable 28*b*. The main computer supplies the axis computer in the drive module with new references every fourth ms. The main-computer module 12 and the client I/O module 20 are connected to each other via a field bus 30.

Which modules, and how many of each type, are included in the control system varies depending on the application. There should be at least a main-computer module, a drive module and a control module. The control system may have no or several transformer modules and no or several client I/O modules, respectively. In a small robot configuration, the transformer may instead be located in the drive module.

The invention is not limited to the embodiments shown but may be varied and modified within the scope of the appended claims. The division of the modules with respect to what functions they are to handle may be done in other ways than those shown in the above-described embodiments. The number of different types of modules may also vary. The principle for the division of the functions of the control system into different modules is that these functions are divided in such a way as to require as small an exchange of information between the modules as possible. In another embodiment of the invention, the drive module comprises only the axis computer and the drives are instead arranged on the robot adjacent to the motors.

The invention claimed is:

1. A control system for controlling movements of at least two manipulators, the control system comprising:
   a main computer module configured to execute programs with instructions for movements of the at least two manipulators, to plan movement paths of the at least two manipulators, and to generate orders for the at least two manipulators based on the movement paths, the main computer module further comprising a power supply configured to supply power to the main computer module;
   at least two drive modules, wherein one of the drive modules is operatively connected to one of the at least two manipulators, each drive module being physically separate from each other and from the main computer module, each drive module being operatively connected to one of the at least two manipulators and to at least one of the main computer module and one of the at least two drive modules to permit each module to communicate with at least one of the main computer module and one of the at least two drive modules, each drive module comprising
      a drive unit that controls motors driving the movements of the manipulator to which the drive unit is operatively connected,
      an interface configured to provide an interface with at least one of the main computer module and one of the at least two drive modules,
      a power supply configured to supply power to the drive module and supply power to the manipulator to which the drive unit is operatively connected, and
      an axis computer configured to provide control signals to the drive unit based on the orders received from the main computer module to control movement of the manipulator to which the drive unit is operatively connected, and
   a communication network operatively connecting the main computer module and the drive modules to permit the main computer module to transmit the orders to the at least two manipulators.

2. The control system according to claim 1, wherein the communication network comprises an Ethernet link.

3. The control system according to claim 1, further comprising:
a transformer module comprising a transformer and a power supply, the transformer module being physically separated from the main computer module and the drive modules.

4. The control system according to claim 1, further comprising:
a control module comprising a control panel of the control system and a power supply, the control module being physically separate from the main computer module and the drive modules, the control module being operatively connected to the main computer module and the drive modules.

5. A method for controlling at least two manipulators with a control system, the method comprising:
planning with a main computer module movement paths of the at least two manipulators, wherein the main computer module is powered by a main computer module power supply;
generating with the main computer module orders for movement of the at least two manipulators based on the movement paths;
transmitting from the main computer module through a communication network the orders for the at least two manipulators to separate interfaces of at least two drive modules physically separate from each other and from the main computer module, each drive module being powered by a separate drive module power supply;
receiving through the communication network the orders from the main computer module with an axis computer included in each of the at least two physically separate drive modules;
generating with the axis computer control signals based on the orders received from the main computer module;
transmitting the control signals to a drive unit included in each of the at least two physically separate drive modules; and
driving motors of each of the at least two manipulators with the drive unit included in each of the at least two physically separate drive modules, wherein power is supplied to each manipulator with a power supply included in each drive module.

6. The control system according to claim 1, further comprising: a client I/O module.

7. The control system according to claim 1, wherein each drive unit comprises one or more drives.

* * * * *

UNITED STATES PATENT AND TRADEMARK OFFICE
CERTIFICATE OF CORRECTION

PATENT NO. : 7,630,775 B2  Page 1 of 1
APPLICATION NO. : 10/517145
DATED : December 8, 2009
INVENTOR(S) : Ryegård et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 645 days.

Signed and Sealed this

Second Day of November, 2010

David J. Kappos
*Director of the United States Patent and Trademark Office*